No. 737,639. Patented September 1, 1903.

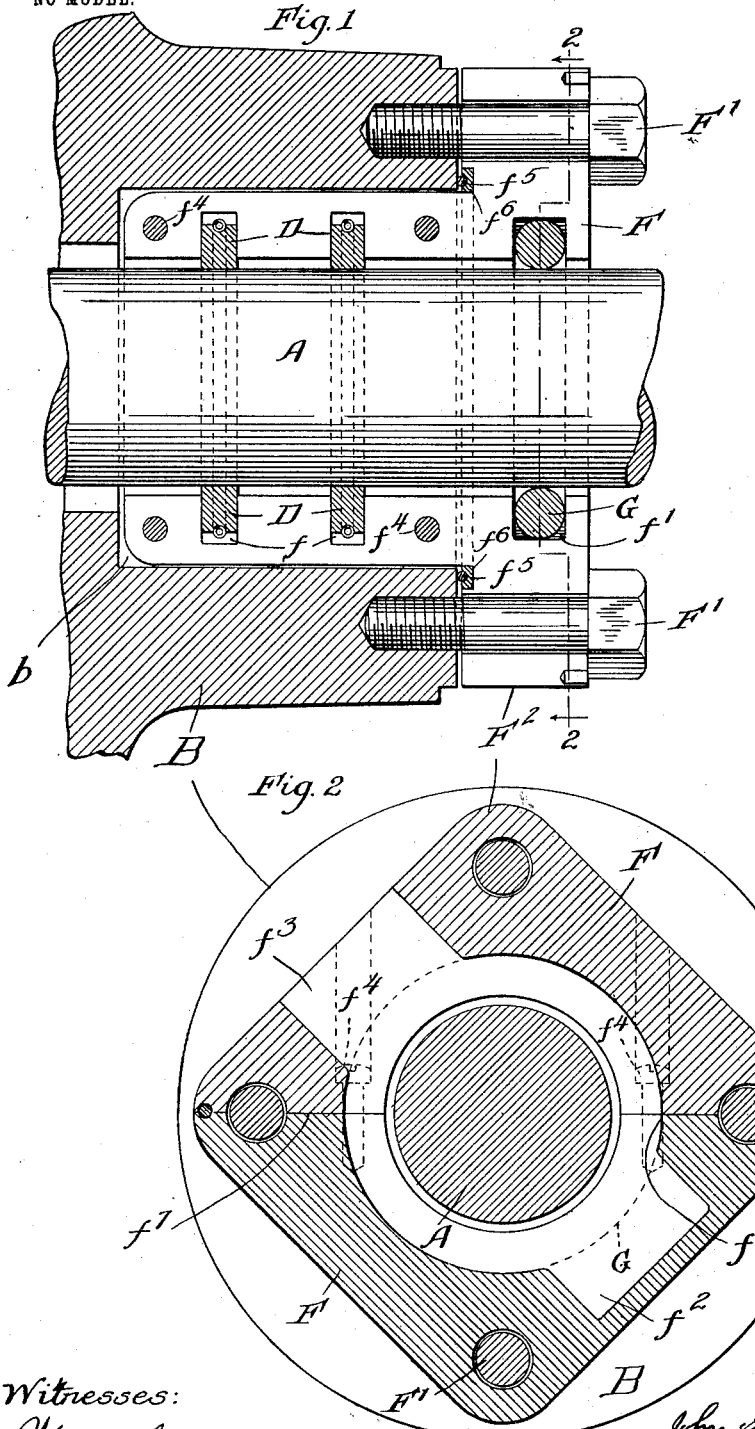

UNITED STATES PATENT OFFICE.

JOHN H. LEWIS AND LOUIS G. KUNZER, OF CHICAGO, ILLINOIS.

GLAND FOR PISTON-ROD PACKING.

SPECIFICATION forming part of Letters Patent No. 737,639, dated September 1, 1903.

Application filed May 14, 1903. Serial No. 157,033. (No model.)

*To all whom it may concern:*

Be it known that we, JOHN H. LEWIS and LOUIS G. KUNZER, citizens of the United States, residing in Chicago, in the county of Cook and State of Illinois, have invented a new and useful Improvement in Glands for Piston-Rod Packing, of which the following is a specification.

Our invention relates to improvements in glands for piston-rod packing.

The object of our invention is to provide a piston-rod-packing gland of a simple, efficient, durable, and economical construction which will materially increase the efficiency and life or durability of the piston-rod packing and its ease and smoothness of operation.

Our invention consists in the novel construction of parts and devices and in the novel combinations of parts and devices herein shown and described and by which this object or result is practically accomplished.

In the accompanying drawings, forming a part of this specification, Figure 1 is a central horizontal longitudinal section of a device embodying our invention, and Fig. 2 is a cross-section on line 2 2 of Fig. 1.

In said drawings, A represents the piston-rod, and B a portion of the cylinder-head through which the piston-rod reciprocates, the same having an opening or chamber $b$ to receive the packing-gland F. The gland F is secured to the cylinder-head B by bolts F' and is preferably divided or made in two halves or parts for convenience of application around the piston-rod. The gland F is furnished with one or more, preferably two, annular grooves or recesses $f$ to receive the metallic packing or packings D. Each of the packings D is preferably of the construction shown and described in our Patent No. 721,710, of March 3, 1903, to which reference is here made for more full description of the packing. The gland F is provided at its outer end with an annular channel or groove $f'$ to receive a lubricant holder or wick G of any suitable fibrous material—such, for example, as ordinary candle-wicking—with a communicating lubricant-chamber $f^2$ and a slot or opening $f^3$, through which the oil or lubricant may be supplied to the lubricant holder or wick G.

The two segments or parts of the packing-gland F are secured together by bolts $f^4$. A packing $f^5$, of wire or other suitable material, is interposed between the packing-gland F and the cylinder-head B, the gland being furnished with an inserted metal ring $f^6$ to bear against the packing-ring $f^5$. The line of separation or division $f^7$ between the two parts of the gland F is preferably horizontal, as illustrated in the drawings, and the slot or opening $f^3$ for feeding in the lubricant preferably extends diagonally between the bolts F' through the head or flange $F^2$ of the gland.

By providing the gland F with an annular lubricant-groove $f'$ outside the cylinder-head and with a lubricant holder or wick G therein we are enabled to keep the piston-rod, and through it the metallic packings D D, properly lubricated all around or throughout the whole circumference of the piston-rod, and thus cause the piston-rod to work smoothly and easily and at the same time add greatly to the life and durability of the packing and to its efficiency and operation.

We claim—

1. A piston-rod-packing gland having an annular lubricant channel or groove and a lubricant-holder therein, substantially as specified.

2. A piston-rod-packing gland having an annular lubricant channel or groove and a lubricant-holder therein, said gland being provided with a lubricant-chamber and a feed slot or opening for the lubricant, substantially as specified.

JOHN H. LEWIS.
LOUIS G. KUNZER.

Witnesses:
H. M. MUNDAY,
P. ABRAMS.